United States Patent [19]

Eguchi

[11] Patent Number: 5,227,925
[45] Date of Patent: Jul. 13, 1993

[54] FILTER HOLDER
[75] Inventor: Haruki Eguchi, Tokyo, Japan
[73] Assignee: Asahi Kogaku Kogyo Kabushiki Kaisha, Tokyo, Japan
[21] Appl. No.: 885,361
[22] Filed: May 19, 1992
[30] Foreign Application Priority Data May 20, 1991 [JP]  Japan .................. 3-45104[U]

[51] Int. Cl.⁵ .................................................. G02B 5/22
[52] U.S. Cl. ...................................... 359/892; 354/286
[58] Field of Search ................ 359/885, 892, 894; 354/275, 276, 286

[56] References Cited

U.S. PATENT DOCUMENTS

| | | | |
|---|---|---|---|
| 3,758,200 | 9/1973 | Saito | 359/892 |
| 4,050,791 | 9/1977 | Watanabe | 359/892 |
| 4,302,078 | 11/1981 | Stravitz | 359/892 |
| 4,384,767 | 5/1983 | Kawai | 359/892 |
| 4,533,212 | 8/1985 | Shimizu | 359/892 |
| 4,536,057 | 8/1985 | Sumi et al. | 359/892 |
| 4,922,280 | 5/1990 | Koshino et al. | 354/403 |

Primary Examiner—Loha Ben
Attorney, Agent, or Firm—Sandler Greenblum & Bernstein

[57] ABSTRACT

A filter holder according to the present invention is provided with a frame installed in a freely mountable and detachable manner in a lens barrel. A female screw formed on one side of the frame in the direction extending along the optical axis of the lens barrel and set by screwing in a male screw of a screw type filter. A plate spring installed on the other side of the frame along the extending direction of the optical axis of the lens barrel mentioned above, is capable of holding a film-shaped filter therein, between the other side surface of the frame and the plate spring.

10 Claims, 5 Drawing Sheets

FILTER HOLDER

BACKGROUND OF THE INVENTION

The present invention relates to a filter holder to be mounted on a lens barrel.

It has been, in general, industrial practice heretofore to use a screw type filter for a filter mounted on a lens barrel. However, a film-shaped filter, such as a gelatin filter, has recently come into use. In the conventional construction, a screw type filter and a film-shaped filter have respectively been set in filter holders for installation thereof on a lens barrel. Therefore, it has not been possible to install a film-shaped filter, as set in a filter holder for a screw type filter, or conversely, to install a screw type filter, as set in a filter holder for a film-shaped filter. Nor has it ever been possible to use both a screw type filter and a film-shaped filter at the same time.

SUMMARY OF THE INVENTION

The present invention has been made in view of the above-mentioned disadvantages of the conventional filter holder. A primary object of the present invention is, therefore, to offer a filter holder which can accept either one or both of a screw type filter and a film-shaped filter, either independently or at the same time.

Another object of the present invention is to offer a filter holder which is so simple in construction that it permits an easy installation thereof on a lens barrel.

Still another object of the present invention is to offer a filter holder which, as used on a lens barrel, can maintain a favorable state of installation thereof on a lens barrel.

In order to resolve the problems mentioned above and thereby to attain the above-mentioned objects, one aspect of a filter holder according to one embodiment of the present invention, is so constructed that it is characterized by being provided with a frame installed in the lens barrel in such a way that the frame can be freely inserted thereinto or removed therefrom. Screw joint means are installed on one side of this frame along an extending direction of the optical axis of the lens barrel and provided with a screw part in screw joint with a screw part of a screw type filter. A clamping means is provided on the other side of the lens barrel along the extending direction of the optical axis thereof, to clamp a film-shaped filter between the other side surface of the lens barrel and the clamping means.

A construction of a filter holder according to the present invention in this manner makes it possible to use either a screw type filter or a film-shaped filter selectively, or to use both of them at the same time.

Moreover, in another aspect of the present invention, a filter holder is constructed in an integral structure with a frame and is characterized by being further provided with a mounting base formed in an integral structure with a frame, and inserted into a filter mounting groove formed on a lens barrel. A mounting and detaching shaft is supported on the mounting base in such a manner that it can move along an extending direction of the radius of the lens barrel and can rotate around the axial line of this movement. Locking means are installed on the mounting and detaching shaft, to lock the filter holder on the lens barrel in such a manner that the filter holder can be unlocked.

Owing to the construction of the filter holder according to the present invention in this manner, the filter holder in such a simple structure can be easily installed on the lens barrel and removed therefrom and also securely maintain its installed state.

BRIEF DESCRIPTION OF THE DRAWINGS

The manner by which the above objects, features and advantages of the present invention are attained will be fully evident from the following detailed description when it is considered in light of the drawings, wherein.

DETAILED DESCRIPTION OF PREFERRED EMBODIMENT

Now, with reference to the accompanying drawings, a detailed description will be made of one example of preferred embodiment of a filter holder formed according to the present invention for use on a lens barrel.

Figure 1:
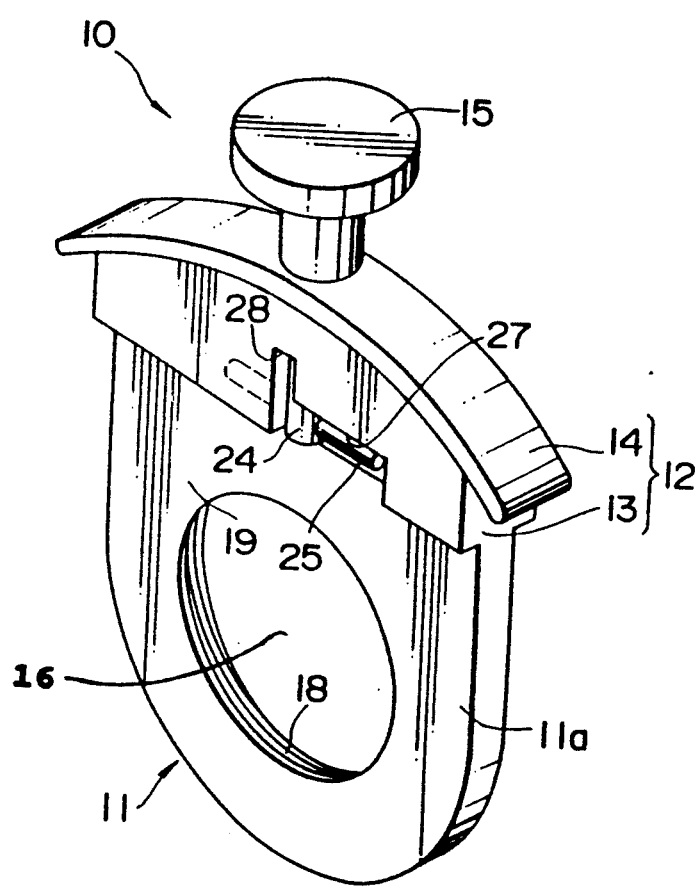
FIG. 1 presents a perspective view illustrating the construction of one perspective view illustrating the construction of one example of a preferred embodiment of a filter holder according to the present invention.
Figure 2:
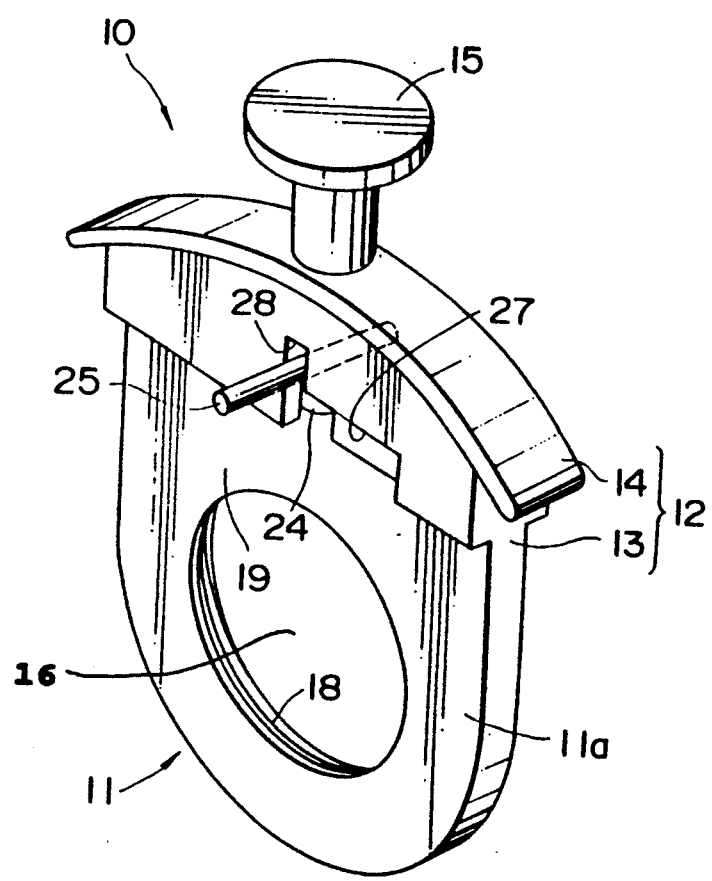
FIG. 2 presents a perspective view illustrating the filter holder shown in FIG. 1 in its state in which the locking pin is projecting.
Figure 3:
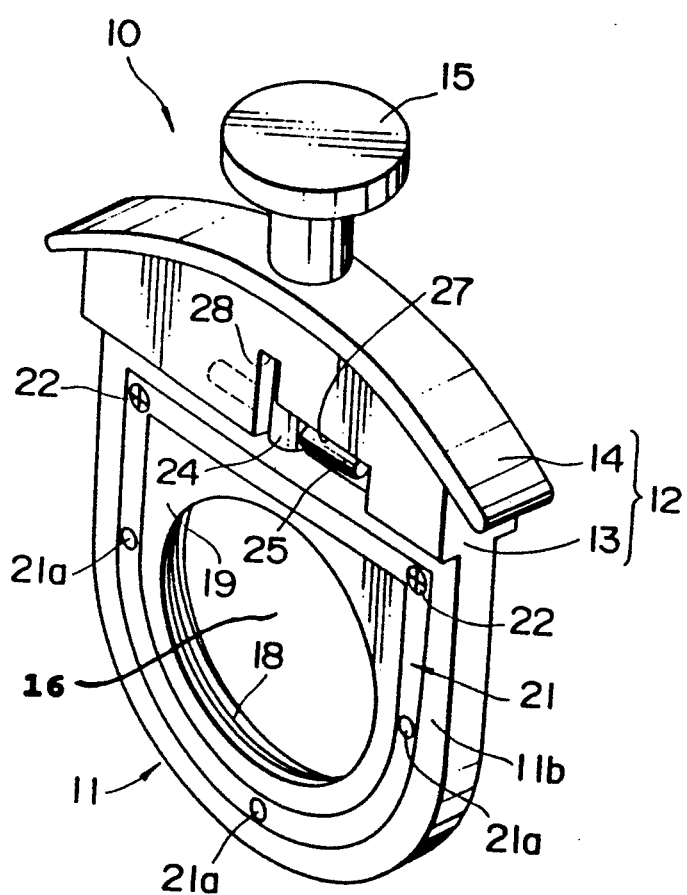
FIG. 3 presents a perspective view illustrating the filter holder shown in FIG. 1 as viewed from its back side.

FIG. 1 and FIG. 2 respectively illustrate the outer shape of a filter holder 10, in one example of a preferred embodiment of the present invention, in different operating states as viewed from its surface (in other words, as viewed from one side along a line in the direction of the optical axis) of a lens barrel 30 (see FIG. 4 and FIG. 5) on which this filter holder 10 is installed. FIG. 3 illustrates the shape of the filter holder 10 as viewed from its back surface (in other words, as viewed from the other side along a line in the direction of the optical axis of the lens barrel 30.

Figure 4:
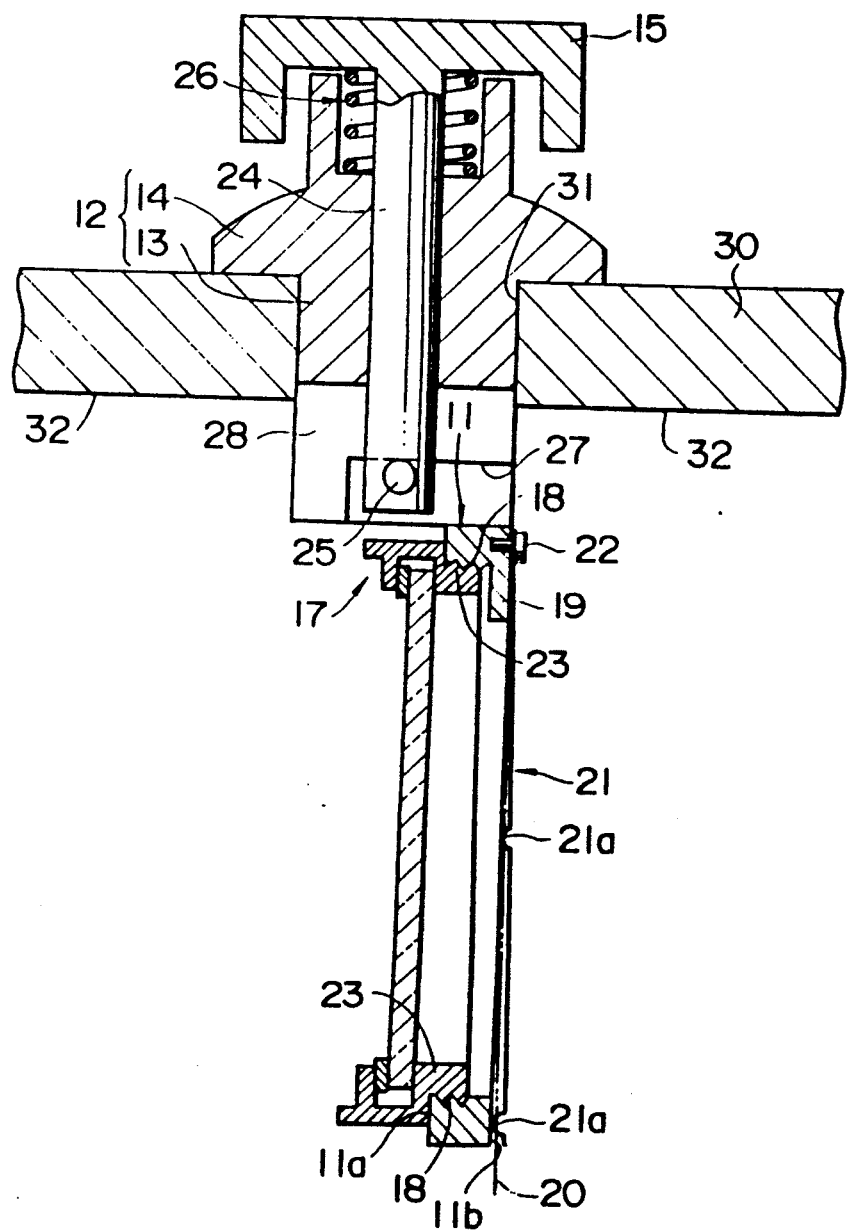
FIG. 4 presents a sectional view illustrating the filter holder as installed on a lens barrel and kept in its unlocked state.
Figure 5:
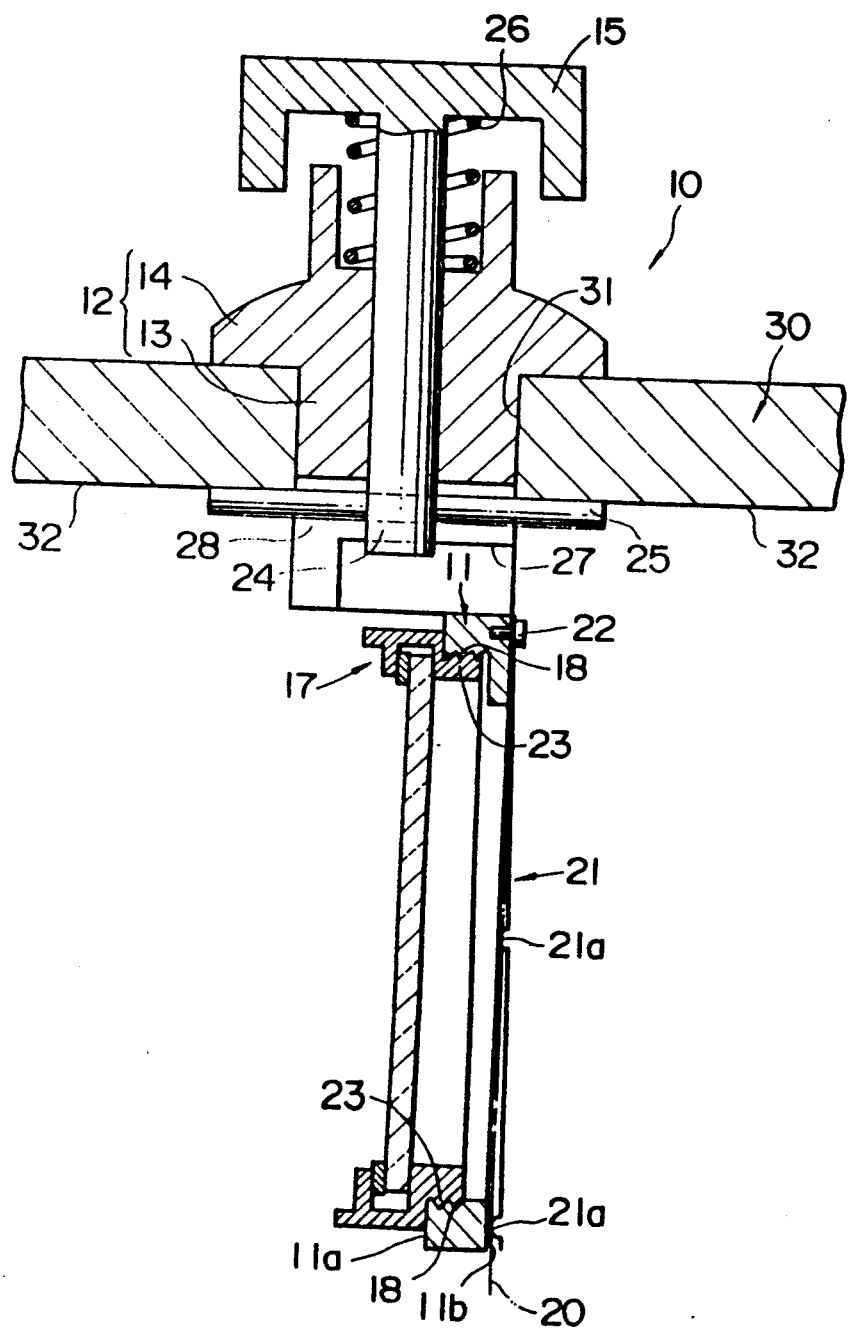
FIG. 5 presents a sectional view illustrating the filter holder as installed on a lens barrel and kept in its locked state.

Filter holder 10 includes frame 11, in an approximate shape of a round ring, and mounting base 12, formed in a unified structure on the upper part of frame 11. Frame 11 is provided with a front surface 11a, which is arranged on one side along a line in the direction of the optical axis of the lens barrel 30, and a back surface 11b, which is arranged on the other side. Front and back surfaces 11a and 11b are in parallel with each other, such that they cross the optical axis at right angles. Mounting base 12 is provided with a plate-shaped part 13, which is formed in a thickness larger than the that of the frame 11, and an arc-shaped part 14, which is connected to form a unified structure with the upper part of plate-shaped part 13, and formed in a state with an overhang in excess of plate-shaped part 13, so that the mounting base 12 can be inserted into the filter inserting groove 31 (as shown in FIG. 4 and FIG. 5). The bottom area of arc-shaped part 14 includes a circumferential surface formed in such a manner as to extend along the outer circumferential surface of the lens barrel 30 and to be in close contact therewith. Further, a mounting and detaching knob 15 is installed in the central area of arc-shaped part 14 in such a manner as to permit the mounting and detaching knob 15 to move along the line in the direction of the radius of frame 11 (in other words, in the direction crossing the direction of the optical axis at right angles) and also to rotate freely around this axial line of movement.

Opening 16, having an approximately round shape is formed in the central area of the frame 11, as shown in FIG. 1 and FIG. 2. A female thread part 18, which is to accept a screw type filter 17 (shown in FIG. 4 and FIG. 5) as screwed thereinto, is cut helically in the entire circumference in the area on the side of the front surface area 11a (namely, on this side in the state shown in FIGS. 1 and 2) of the frame 11 mentioned above on the inner circumferential area of this opening 16. Moreover, a flange part 19, which extends inwards in the direction of the radius, is formed in a unified structure over the entire circumference, as it is clearly observed in FIG. 4, on the inner circumferential surface of opening 16, at the side of the back surface 11b of the frame 11 mentioned above (namely, in the area on the farther side in the state shown in FIGS. 1 and 2 and on this side in the state shown in FIG. 3). The back surface 11b of frame 11 and the back surface of flange part 19 are formed to be flush with each other. Clamping plate spring 21, which holds a film-shaped filter 20, by clamping it between these parts, is set across the back surface 11b of frame 11 and the back surface of the flange part 19.

Clamping plate spring 21 is formed, as a whole, in an approximate shape of a ring confronting the back surface 11b of the frame 11. Clamping plate spring 21 is fixed with fixing screws 22 on the back surface 11b of the frame 11 at two points shown in the upper part of the Figure. Also, clamping plate spring 21 is provided with a plural number of clamping protrusions 21a, located in the part not fixed with fixing screws 22, and projecting towards the side of the frame 11. With these clamping projections 21a, the film-shaped filter 20, nipped between the frame 11 and the clamping plate spring 21, is kept in its close contact with the back surface 11b of the frame 11.

Film-shaped filter 20 is to be inserted between the clamping plate spring 21 and the frame 11 accordingly: while the clamping spring 21 is elastically lifted up by its lower part and separated from the back surface 11b of the frame 11, the film-shaped filter 20 is thereafter secured in its state of being nipped between the frame 11 and the clamping plate spring 21 by means of the clamping protrusions 21a and releasing the lifting force of clamping plate spring 21. A screw type filter 17 is secured in its state of being secured in screw joint by driving a male screw part 23 formed on the outer circumferential area of the filter 17 into the female screw part 18 mentioned above on the side of the front surface 11a of the frame 11.

Thus, the frame 11 holds a screw type filter 17 and a film-shaped filter 20 at the same time or holds either a screw type filter 17 or a film-shaped filter 20 alone (namely, selectively).

In the meanwhile, the mounting base 12 for the filter holder 10 holds a mounting and detaching shaft 24 having a mounting and detaching knob 15 fixed in a unified structure in its central area in such a manner as to permit the mounting and detaching shaft 24 to move freely in its straight movement along a line in the direction of the radius of the clamping plate spring 21 and to rotate freely around this moving axial line. At the end part in relation to the inner side of this mounting and detaching shaft 24, a locking pin 25, which is set in such a way as to extend along the axial line crossing the mounting and detaching shaft 24 at right angles, is fixed at the central part of the above-mentioned shaft. This mounting and detaching shaft 24 and the locking pin 25 are given impetus for its outward displacement in the direction of the radius by a compressing spring 26 inserted between the mounting and detaching knob 15 and the mounting base 12.

Moreover, an unlocking groove 27, which holds locking pin 25 in its unlocked position, and a locking groove 28, which permits the locking pin 25, which has rotated just by approximately 90 degrees along the line in the direction of the radius, as shown in the drawing, round the axial line of the mounting and detaching shaft 24 from the position where the locking pin 25 is in the unlocking position, to move along the line in the direction of the radius of the lens barrel 30 mentioned above are formed on the bottom area of the plate-shaped part 13 of the mounting base 12 mentioned above. In this case, the unlocking position is set up as a position which permits the filter holder 10 to be inserted into the lens barrel 30 and to be moved out therefrom, which, in other words, means the position in which the filter holder 10 does not interfere with the inner circumferential surface 32 of the lens barrel 30. The locking position is set up as a position in which the filter holder 10 is prohibited from being drawn out of the lens barrel 30, the filter holder 10 being in interference (namely, in engagement) with the inner circumferential surface 32 of the lens barrel 30.

Therefore, this unlocking groove 27 is formed in such a state as to open into the right half part of the bottom area of the front surface of the mounting base 12, as shown in FIG. 1, and also to open into the right half part of the bottom area of the back surface of the mounting base 12 as shown in FIG. 3, respectively, so that the unlocking groove 27 may lead the locking pin 25 into the inside of the mounting base 12, thereby enabling the mounting base to slide in the filter inserting groove 31 and to open into the bottom area of the mounting base 12 and also permitting this locking pin 25 to rotate in the clockwise direction, as shown in the drawing, round the mounting and detaching shaft 24 and thereby to protrude from the mounting base 12. In the meantime, the locking groove 28 is connected so as to maintain intercommunication with the central area of the unlocking groove 27 and is formed in such a size as will permit the locking pin 25 to move outwards in the direction of the radius from the inner circumferential surface of the lens barrel 30 by the force applied by the compressing spring 26. The female screw part of the frame 11 is set by helically driving it into the male screw part 23 of the screw type filter 17 and/or the film-shaped filter 20 is held by clamping it between the frame 11 and the clamping plate spring 21 when the filter holder 10 is in its state of being detached (i.e. drawn out) from the filter inserting groove 31 on the lens barrel 30. After this, the locking pin 25 is kept in the unlocking groove 27. That is to say, the locking pin 25 is set in the state in which it is held along the plane on the top surface side of the plate-shaped part 13 of the mounting base 12 and is then positioned within this plane. The unlocked state is set up in this manner.

When the frame 11 and the mounting base 12 are inserted into the filter inserting groove 31 in the lens barrel 30, while the unlocked state is thus maintained, the arc-shaped part 14 comes into direct contact with the outside surface of the lens barrel 30, thereby restricting the inserting operation. The locking pin 25 enters into the locking groove 28 when the mounting and detaching knob 15 is rotated by approximately 90 degrees in the clockwise direction round the mounting and detaching shaft 24, while it is pushed inwards in the direction of the radius in counteraction with the force exerted by the compressing spring 26 in the state of completion of this inserting operation. When the mounting and detaching knob 15 is thereafter released from its state of being pushed in, the locking pin 25 is displaced outwards in the direction of the radius by the force applied by the compressing spring 26. As the result of this displacement, the locking pin 25 is brought into its direct contact with the inner circumferential surface 32 of the lens barrel 30, and the filter holder 10 is thereby locked so that it cannot be drawn out of the lens barrel 30, and the locked state is set up in this manner.

To release the lock of the filter holder 10 as set in the locked state in this manner, the mounting and detaching knob 15 is to be rotated just by 90 degrees in the direction opposite to that of its rotation in the locking operation round the mounting and detaching shaft 24, while the mounting and detaching knob 15 is pushed inwards again in the direction of the radius of the frame 11 in counteraction with the force exerted by the compressing spring 26, and the mounting and detaching knob 15 is thereby released from its state of being pushed in. Then, the locking pin 25 is retracted into the unlocking groove 27. The unlocked state is set up in this manner again.

As described in the foregoing part, the filter holder 10 in this example of preferred embodiment of the present invention makes it possible to use either one of the screw type filter 10 and the film-shaped filter 20 selectively, or both at the same time. Also, the filter holder 10 is capable of holding the film-shaped filter 20 securely and accurately by its simple operation. In addition, the filter holder can be mounted on and detached from the lens barrel 30 with ease and in a simple manner.

The present disclosure relates to subject matters contained in Japanese Utility Model Application No. HEI 3-45104 filed on May 20, 1991, which is expressly incorporated herein by reference in its entirety.

What is claimed is:

1. A filter holder mounted on a lens barrel, said filter holder comprising:
    a frame attached in said lens barrel in a manner permitting the free insertion and removal of said frame;
    screw-joint means provided on one side of said frame along an extending direction of the optical axis of the lens barrel and provided with a screw part to be set by screwing thereof into a screw part of a screw type filter; and
    clamping means provided on a side of said frame opposite said one side, for clamping and holding a film-shaped filter between said opposite side of the frame and said clamping means.
2. The filter holder according to claim 1, wherein said screw part of said screw type filter comprises a male screw part, and
    said screw-joint means includes:
        an opening formed as a substantially round shape in said frame; and
        a female screw part formed on an inner circumferential surface of said substantially round opening and set by screwing thereof into its screw joint with said male screw part.
3. The filter holder according to claim 2, wherein said female screw part is formed on one side of said inner circumferential surface of said opening, as viewed along the axial direction of said frame, and said screw type filter is mounted on said surface at said one side of said frame.
4. The filter holder according to claim 3, wherein said clamping means is provided with a plate spring member which elastically clamps a film-shaped filter between itself and the surface of said opposite side of said frame.
5. The filter holder according to claim 4, wherein said plate spring member is formed in a substantial ring shape and arranged around the outer circumference of said opening.
6. The filter holder according to claim 5, wherein said plate spring member is fixed at an upper part thereof on said frame, and is provided with at least one protrusion formed for engagement therewith in a lower part thereof.
7. The filter holder according to claim 5, wherein said plate spring member is fixed by an upper part thereof on said frame by means of a screw.
8. The filter holder according to claim 1, which further comprises:
    a mounting base formed in a structure integral with said frame and insertable in a filter mounting groove formed on the lens barrel;
    a mounting and detaching shaft supported on said mounting base in such a manner as to permit said mounting and detaching shaft to move along a line in the direction of the radius of the lens barrel and to rotate round the axial line of the shaft for movement therealong; and
    locking means which locks said filter holder on the lens barrel in a manner permitting the unlocking of said filter holder.
9. The filter holder according to claim 8, wherein: said locking means includes:
    a locking pin installed on an inner end part of said mounting and detaching shaft in such a manner that said locking pin extends along a line in the direction crossing said direction of the radius of the lens barrel at right angles; and
    spring means which applies force to said locking pins to elicit its movement outwardly along the direction of the radius of the lens barrel.
10. The filter holder according to claim 8, wherein said lens barrel is provided with an inner circumferential surface,
    said locking pin is positionable inwards of the direction of the radius from the inner circumferential surface in the state in which said filter holder is inserted in the filter mounting groove on the lens barrel, and
    said locking means further includes:
        an unlocking groove framed on said frame which accommodates said locking pin in a position in which said locking pin does not interfere with the inner circumferential surface of the lens barrel; and
        a locking groove formed on said frame and securing said locking pin in a position where said locking pin is set into its engagement with the inner circumferential surface of the lens barrel.

* * * * *